(12) United States Patent
Ambacher et al.

(10) Patent No.: US 9,494,312 B2
(45) Date of Patent: Nov. 15, 2016

(54) METHOD OF REPAIRING A PRESSURIZER, AND EQUIPMENT FOR IMPLEMENTING THE METHOD

(75) Inventors: Jérôme Ambacher, Bey (FR); Brice Massazza, Chalon sur Saone (FR); Denis Pollier, Champforgeuil (FR)

(73) Assignee: AREVA NP, Courbevoie (FR)

( * ) Notice: Subject to any disclaimer, the term of this patent is extended or adjusted under 35 U.S.C. 154(b) by 370 days.

(21) Appl. No.: 14/002,818

(22) PCT Filed: Mar. 5, 2012

(86) PCT No.: PCT/EP2012/053745
§ 371 (c)(1),
(2), (4) Date: Oct. 25, 2013

(87) PCT Pub. No.: WO2012/119982
PCT Pub. Date: Sep. 13, 2012

(65) Prior Publication Data
US 2014/0047692 A1 Feb. 20, 2014

(30) Foreign Application Priority Data

Mar. 4, 2011 (FR) ..................... 11 51796

(51) Int. Cl.
| | |
|---|---|
| *F22B 37/58* | (2006.01) |
| *F22B 1/02* | (2006.01) |
| *F22B 37/00* | (2006.01) |
| *G21C 1/09* | (2006.01) |
| *G21C 17/017* | (2006.01) |
| *G21C 19/02* | (2006.01) |
| *G21C 19/20* | (2006.01) |

(52) U.S. Cl.
CPC ............... *F22B 37/58* (2013.01); *F22B 1/025* (2013.01); *F22B 37/003* (2013.01); *G21C 1/09* (2013.01); *G21C 17/017* (2013.01); *G21C 19/02* (2013.01); *G21C 19/207* (2013.01); *Y02E 30/40* (2013.01); *Y10T 29/49815* (2015.01); *Y10T 29/53987* (2015.01)

(58) Field of Classification Search
CPC .......... F22B 37/58; F22B 1/025; G21C 1/09; G21C 1/017; G21C 19/207; G21C 19/02; Y10T 29/53987; Y10T 29/49815
See application file for complete search history.

(56) References Cited

U.S. PATENT DOCUMENTS

| | | |
|---|---|---|
| 5,139,732 A | 8/1992 | Godin |
| 7,093,360 B1 | 8/2006 | Craig |
| 2009/0141848 A1 | 6/2009 | Barois et al. |

FOREIGN PATENT DOCUMENTS

| | | |
|---|---|---|
| CN | 1925062 A | 3/2007 |
| CN | 101351850 A | 1/2009 |
| CN | 201590265 U | 9/2010 |
| DE | 3310387 A1 | 10/1984 |
| EP | 0123076 B1 | 1/1987 |
| EP | 0475799 A1 | 3/1992 |
| FR | 2938964 A1 | 5/2010 |
| FR | 2947662 A1 | 1/2011 |

*Primary Examiner* — Moshe Wilensky
(74) *Attorney, Agent, or Firm* — Davidson, Davidson & Kappel, LLC

(57) ABSTRACT

A method for working on a defective heating element of a pressurizer comprising a tank lying flat along a longitudinal axis and elongate heating elements extending within the tank, and at least one spacer plate through which the heating elements pass and which is capable of maintaining a transverse spacing between the heating elements is provided. The method includes cutting at least one spacer plate around the heating element so as to detach said heating element from said spacer plate, and then extracting the heating element from the tank in one single piece.

12 Claims, 5 Drawing Sheets

US 9,494,312 B2

METHOD OF REPAIRING A PRESSURIZER, AND EQUIPMENT FOR IMPLEMENTING THE METHOD

The invention relates to a method for working on a defective heating element of a pressuriser comprising a tank elongated along a longitudinal axis and elongate heating elements extending within the tank, and at least one spacer plate through which the heating elements pass and which is capable of maintaining a transverse spacing between the heating elements.

BACKGROUND

Pressurised water nuclear reactors have a primary circuit for circulation of the cooling water of the reactor and a pressuriser disposed on a branch of the primary circuit in order to maintain the water pressure in the primary circuit between certain predetermined limits. The pressuriser also carries out the function of compensating for variations in the volume of water in the primary circuit during the operation of the reactor.

The pressuriser comprises a water tank, elongate heating elements or "heating rods", extending in a lower portion of the tank, and a spray nozzle for spraying cold water in the upper portion of the tank. The pressuriser contains water in its lower portion connected to the primary circuit and a vapour bubble in its upper portion. Controlling of the water pressure is done by evaporating the water by means of heating rods and then condensing the vapour by spraying so as to control the volume and pressure of the vapour bubble.

The tank is elongated along a longitudinal axis, oriented vertically. The heating rods pass through a bottom wall of the tank and extend into the interior of the tank parallel to the longitudinal axis.

The pressuriser includes at least one spacer plate, generally two spacer plates in order to hold the heating rods in place transversely. Each spacer plate is fixed in the interior of the tank.

While in operation, a heating rod could become faulty, such that it becomes necessary to proceed with its extraction and possibly its replacement.

In order to extract a heating rod, it is normally required that a downwards traction (pull) be exerted on the heating rod to extract it through the bottom wall.

However, there are cases in which the defective heating rod has a deformed section making it impossible to perform its extraction through the bottom wall of the tank by exerting downwards traction.

Document FR 2666679 discloses a method for the extraction of a defective heating rod having a bulge, wherein the heating rod is cut and then the sections of the heating rod are extracted through an inspection—service opening provided in a top wall of the tank.

However, this method has several drawbacks which make the implementation thereof long, difficult and risky.

On account of the geometry of the spacer plates, accessibility of robotic devices and their handling with no direct visibility is very difficult, which is similarly true for the extraction of the heating rod sections. The existing risks include the generation of debris that would be difficult to recover, as well as loss of the robot and damage to adjacent rods. Furthermore, this process does not provide for the restoration of the surface condition of the openings for passage of the heating rods in the spacer plate or plates, which prevents the subsequent replacement of the damaged heating rods by new rods.

SUMMARY OF THE INVENTION

An object of the invention is to provide a method of intervention enabling the extraction of defective heating rods with significant damage, regardless of the location of the rod in the pressuriser, without risk to the adjacent rods, and with the possibility to replace the extracted rod with a new rod.

To this end the invention provides a method wherein it involves cutting at least one spacer plate around the heating element in a manner so as to detach this heating element from said spacer plate, followed by the extraction of the heating element from the tank.

According to other modes of implementation, the method includes one or more of the following characteristic features, considered individually or in accordance with any technically possible combinations:

- the heating element is extracted in one single piece;
- the heating element is extracted by pulling on an upper end portion of the heating element and/or by pushing on a lower end portion of the heating element, preferably with a lower end portion extending through a wall of the tank and out to the exterior of the tank ;
- the or each spacer plate is cut by means of an electrical discharge cutting tool comprising of an electrical discharge head and an electrical discharge electrode ;
- the electrode is slipped around the heating element and then the electrode is lowered in a manner so as to cut the or each spacer plate around the heating element;
- the cutting tool is fastened on to a spacer plate by positioning the cutting tool while using as reference points the heating elements adjacent to the heating element to be extracted and/or the water circulation openings for the circulation of water through the or each spacer plate ;
- the electrode is tubular;
- the heating element is detached from a through passage sleeve of the heating element through a wall of the tank on the exterior of the tank;
- a replacement heating element is positioned in place at the location of the extracted heating element;
- the heating element is fixed to said spacer plate by means of a section of plate that is attached and fastened to the spacer plate and includes a through opening for passage of the replacement heating element;
- the section of plate is positioned by using as reference points the heating elements adjacent to the replacement heating element, and/or the openings for circulation of water through the or each spacer plate;
- the extracted heating element is disposed in a handling container inside the tank prior to extracting the heating element from the tank.

The invention also relates to a tool apparatus for extracting a heating element of a pressuriser held in place in a tank of the pressuriser by at least one spacer plate, comprising of an electrical discharge cutting tool including a support frame and a tubular electrical discharge electrode carried by an electrode holder mounted in a slidable manner on the support frame.

According to other embodiments, the tool apparatus includes one or more of the following characteristic features, considered individually or in accordance with any technically possible combinations:

a gripping device capable of gripping a heating element extending into the interior of the electrode holder;

a base for positioning and fastening the cutting tool on to a spacer plate, making it possible to position the cutting tool while using as reference points the heating elements adjacent to the damaged heating element and/or the openings for the circulation of water through the spacer plate;

a fastening member for fastening of the cutting tool on to a spacer plate, the fastening member comprising of a body adapted to be inserted into the aligned openings of two parts, a support flange and a retractable clamping finger movable between a retracted position in the interior of the body and an extended position projecting out to the exterior of the body under the effect of a clamping element in a manner so as to clamp together the parts through which the body passes between the flange and the clamping finger.

BRIEF DESCRIPTION OF THE DRAWINGS

The invention and its advantages will be better understood upon reading the description which follows, given solely by way of example and with reference being made to the accompanying drawings, in which.

DETAILED DESCRIPTION

Figure 1:
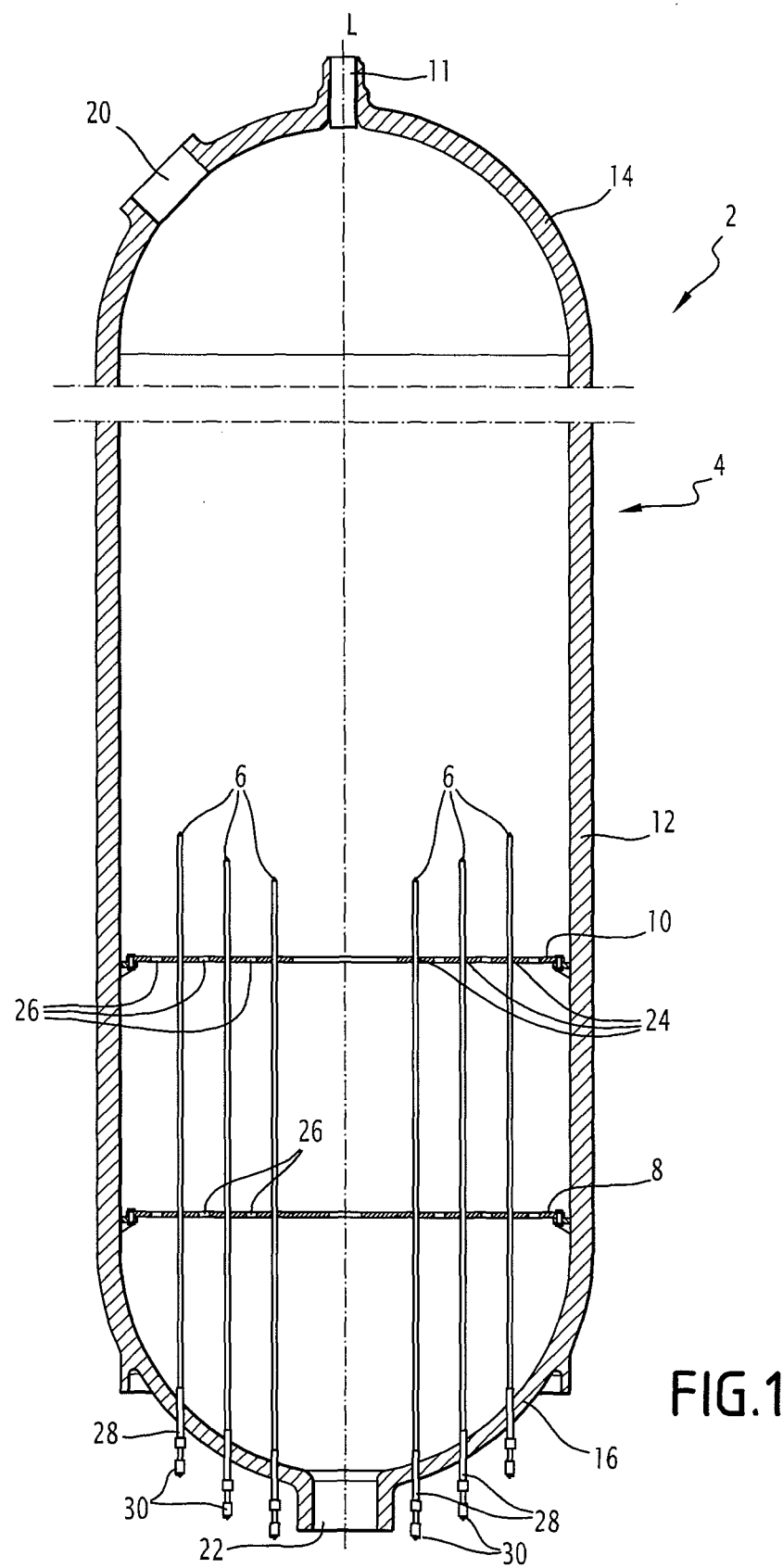
FIG. 1 is a cross sectional view through a vertical plane of a pressuriser of a pressurised water nuclear reactor.

The pressuriser 2 illustrated in FIG. 1 comprises of a tank 4, elongate heating elements or heating rods 6 extending into the interior of the tank 4, a lower spacer plate 8 and an upper spacer plate 10 for holding the heating rods 6 inside the tank 4 and a spray nozzle 11.

The tank 4 is elongated along a longitudinal axis L, oriented vertically. The tank comprises of a tubular cylindrical shell 12 extending along the longitudinal axis L, closed off at its axial ends by a top convex wall 14 and a bottom convex wall 16.

The top wall 14 is penetrated through by an inspection—service opening 20, allowing access to the interior of the tank 4. The spray nozzle 11 is secured to the top wall 14 in a manner so as to spray water downwards.

The bottom wall 16 is penetrated through by an opening for water circulation 22 allowing for connecting the tank 4 by fluid means to the primary circuit of the nuclear reactor.

The heating rods 6 pass through the bottom wall 16 and extend into a lower portion of the tank 4. The heating rods 6 are elongated and extend parallel to each other and to the longitudinal axis L. The heating rods 6 are distributed around the longitudinal axis L along several concentric circular rows, in three rows herein.

The lower spacer plate 8 and the upper spacer plate 10 hold in place the heating rods 6 transversely across the interior of the tank 4. Each heating rod 6 passes through the lower spacer plate 8 and the upper spacer plate 10. The lower spacer plate 8 and the upper spacer plate 10 are each attached at their periphery to the tank 4.

The lower spacer plate 8 and the upper spacer plate 10 are spaced apart along the longitudinal axis. The lower spacer plate 8 is in the shape of a disc. The upper spacer plate 10 is annular and includes a central opening with a large diametre.

The lower spacer plate 8 and the upper spacer plate 10 each include openings for heating rods 24 through which the heating rods 6 extend and openings for water circulation 26 for the circulation of water through the lower spacer plate 8 and the upper spacer plate 10.

The tank includes four tubular sleeves 28 penetrating through the bottom wall 16. Each sleeve 28 is welded to the bottom wall 16 in a sealed tight manner. Each heating rod 6 extends through a respective sleeve 28. Each heating rod 6 is soldered to the associated sleeve in a sealed tight manner.

The heating rods 6 are for example electric heating rods. Each heating rod 6 comprises a sheath and heat dissipating elements that are electrically conductive extending within the heating sheath. Each heating rod 6 comprises at its end located on the exterior of the tank 4 an electrical connector 30 for connection to an electric power supply.

A heating rod 6 may become defective such that it becomes necessary to proceed with its extraction and possibly its replacement.

Figure 2:
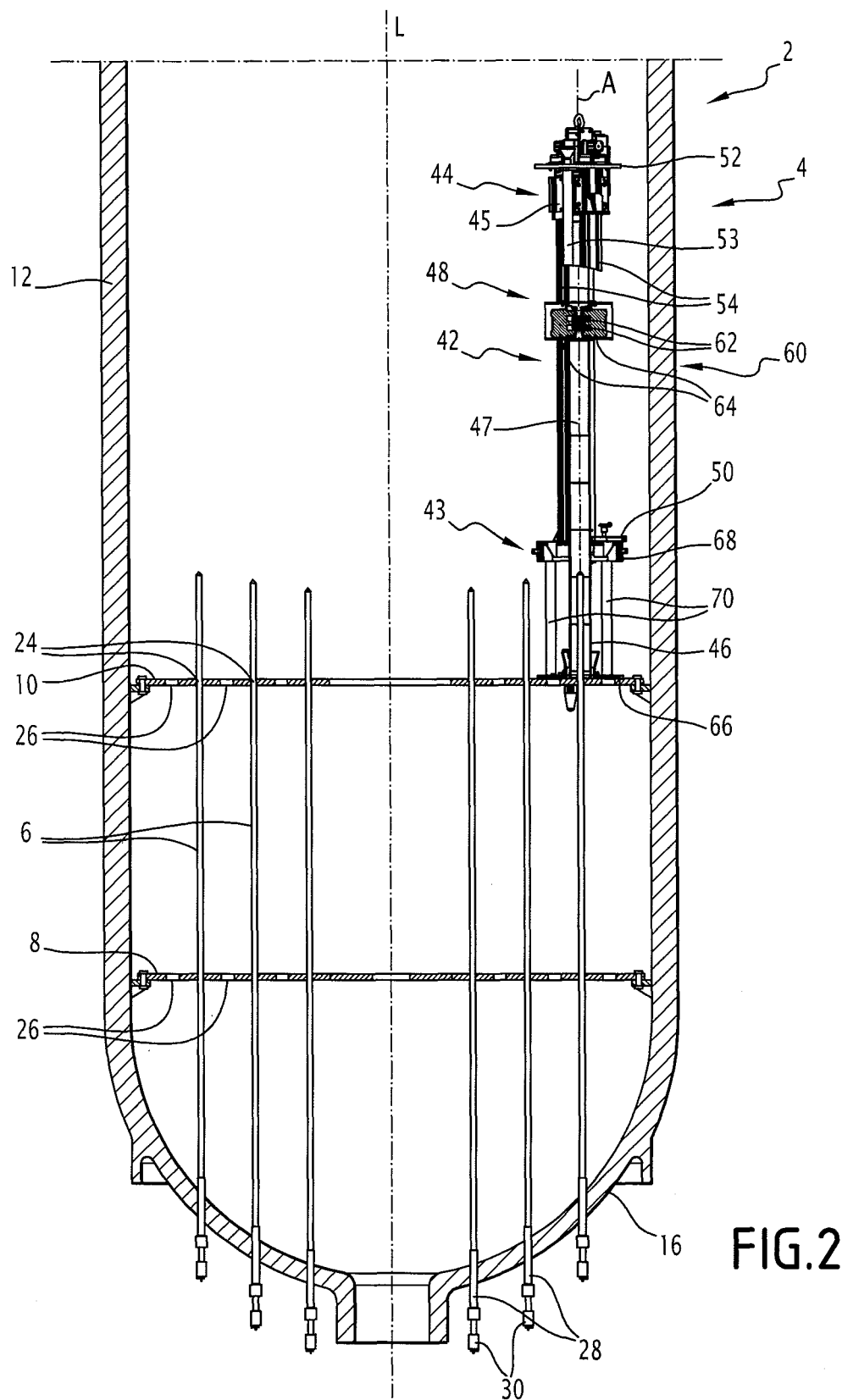
FIGS. 2 and 3 are views similar to that in FIG. 1, illustrating the bottom part of the pressuriser during the steps for extraction of a defective heating rod according to the method of the invention.
Figure 3:
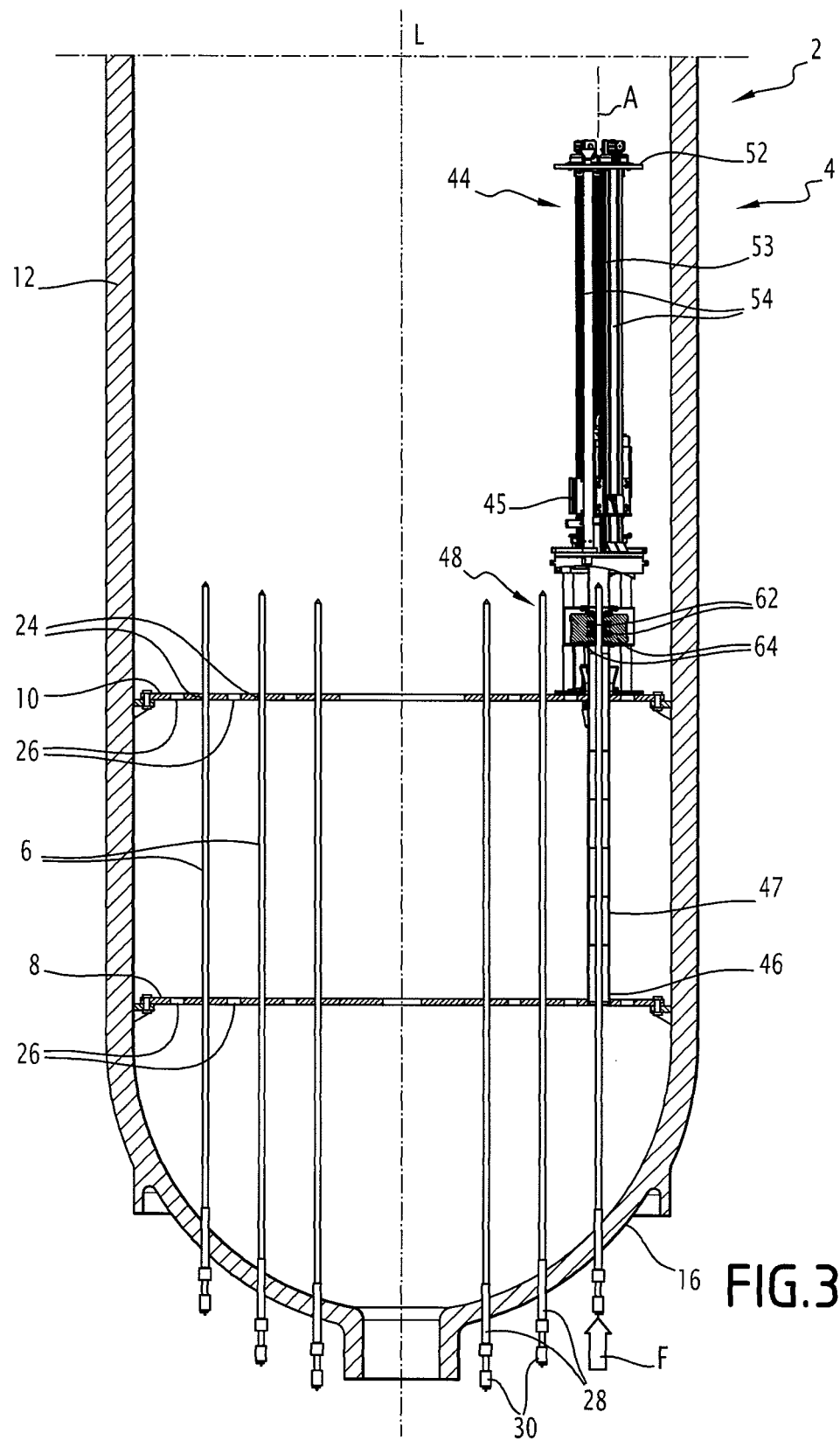

FIGS. 2 and 3 illustrate the steps for extraction of a defective heating rod 6 based on a process according to the invention.

According to the method of the invention, at least one spacer plate is cut around the defective heating rod 6 in a manner so as to detach the defective heating rod 6 from the or each spacer plate that is cut (FIGS. 2 and 3).

In addition, the defective heating rod 6 is detached from the bottom wall 16.

In order to do this, the lower end of the defective heating rod 6 exiting from the sleeve 28 out to the exterior of the tank 4, is detached in a manner so as to allow the defective heating rod 6 to slide in the sleeve 28 towards the interior of tank 4.

Then, the defective heating rod 6 is extracted by pulling exerting upwards traction on the upper end portion of the heating rod and, if this is necessary, a push on the lower end portion of the defective heating rod 6 projecting outside of the tank 4 (Arrow F in FIG. 3), in a manner so as to raise the defective heating rod 6 towards the inside of the tank.

Then, the defective heating rod 6 is removed from the tank 4 through the inspection -service opening 20, the defective heating rod 6 preferably having been previously disposed in a retaining container, given that the defective heating rod 6 is contaminated and may likely no longer be intact.

According to the invention, at least the spacer plates located above the deformed section of the defective heating rod are cut, due to the fact that the deformed section prevents the sliding of the defective heating rod 6 through the spacer plates located there above.

Depending on the specific circumstances, it is possible to not cut all of the spacer plates. If the deformed section is located below the lowermost spacer plate, all of the spacer plates are cut. If the deformed section is located between two spacer plates and the defective heating rod 6 is able to slide through the or each spacer plate located below the deformed section, one need cut only the spacer plates situated above the deformed section, or all of the spacer plates.

The method of the invention can be implemented on any defective heating rod, including a heating rod having no apparent deformation, but the extraction of which may prove to be difficult or impossible by exerting downward traction, due to the friction being too high between the heating rod and the spacer plates and/or the sleeve 28.

Figure 4:
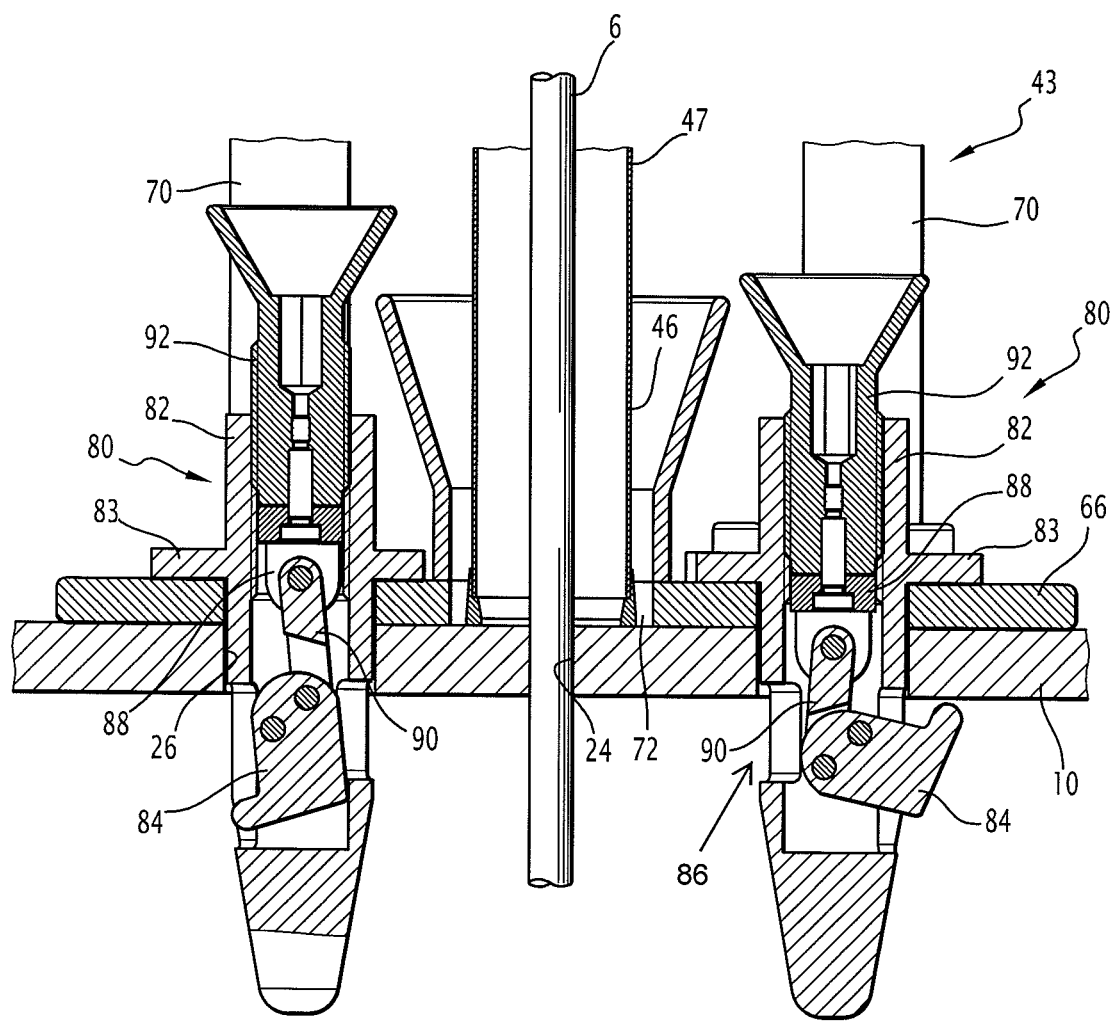
FIG. 4 is a partial schematic cross sectional view of a base for positioning of a cutting tool apparatus attached to a top spacer plate of the pressuriser.

A tool apparatus 40 for extraction of heating rods is illustrated in FIGS. 2 to 4.

As illustrated in FIGS. 2 and 3, the tool apparatus 40 comprises of a cutting tool 42 and a base 43 for fastening the cutting tool 42 on the upper spacer plate 10.

The cutting tool 42 comprises of a support frame 44, an electrical discharge head 45 mounted in a slidable manner on the support frame 44 along a sliding axis A, an electrical discharge electrode 46 carried by an electrode holder 47 fixed to the electrical discharge head 45, and a gripping device 48 capable of gripping the top end of a heating rod 6 so as to pull it upwards with the cutting tool 42.

The support frame 44 and the electrical discharge head 45 are shown partially shaded in FIGS. 2 and 3, while the base 43, the electrode 46, the electrode holder 47 and the gripping device 48 are shown in cross section for the purposes of illustration.

The support frame 44 includes a bottom nozzle 50 and a top nozzle 52 spaced out along the sliding axis A and connected by upright posts (not shown). The lower nozzle 50 is annular.

The support frame 44 comprises of sliding rails 54 extending between the top nozzle and the bottom nozzle 52 along the sliding axis. The electrical discharge head 45 is mounted in a slidable manner on the sliding rails 54.

The electrode 46 is tubular and circular and centred on the sliding axis A. It has a circular cutting edge. The electrode 46 is electrically powered by the electrical discharge head 45.

The electrode holder 47 is tubular extending along the sliding axis A. The electrode is fixed to the lower end of the electrode holder 47. The other upper end of the electrode holder 47 is connected to the electrical discharge head.

During movement of the electrical discharge head 45, the electrode 46 and the electrode holder 47 slide through the bottom nozzle 50.

The gripping device 48 is disposed on the electrode holder 47 at a distance from the electrode 46 and in the proximity of the electrical discharge head 45. It includes a jaw 60 comprising of the clamping elements 62 that are movable radially under the effect of actuators 64 towards the centre of the support tube 54 so as to clamp the end of a heating rod 6 extending into the interior of the electrode holder 47. The jaw 60 herein comprises two clamping elements 62 that are diametrically opposed.

The base 43 is adapted to be positioned and fastened on the upper spacer plate 10 it being positioned relative to the defective heating rod 6 and bearing upon the upper spacer plate 10 between adjacent heating rods 6.

The base 43 is adapted to accommodate the cutting tool 42 supported on the base 43. The base 43 has a central passage allowing for the movement of the electrode holder 47 through the base 43.

The base 43 comprises a lower support plate 66, an upper annular seat 68, and the upright posts 70 extending between the lower support plate 66 and the upper seat 68.

The upper seat 68 is provided to serve as support for the bottom nozzle 50 of the cutting tool 42. The upper seat 68 and the bottom nozzle 50 are provided to abut against each other via corresponding conical bearing surfaces enabling the centring of the cutting tool 42. The bottom nozzle 50 includes means for fastening on the upper seat 68, for example clamping screws.

As illustrated in FIG. 4 which shows the lower part of the base 43 in cross section in a sectional plane different from that in FIGS. 2 and 3, the support plate 66 comprises a central opening 72 for the passage of upper end portion 6 of the defective heating rod.

The heating rods being close to each other, the support plate 66 also has openings for the passage of the rods adjacent to the rod that has been removed.

The upright posts 70 are of a height greater than that of the end portions of the heating rods 6 protruding out above the upper spacer plate 10. The upper seat 68 thus is located above the upper ends of the heating rods 6.

The support plate 66 comprises fastening members 80 provided in order for each to be engaged in a respective opening for water circulation 26 of the upper spacer plate 10 so as to position the support plate 66 relative to the defective heating rod 6 and fasten it on to the upper spacer plate 10.

Each fastening member 80 comprises a tubular body 82 having a support flange 83 projecting radially outwards, a pivoting gripping finger 84 mounted to be rotatable inside the tubular body 82 and movable through a lateral window of the tubular body 82 between a retracted position in the interior of the tubular body 82 (on the left in FIG. 4) and an extended position projecting out to the exterior of the tubular body 82 (on the right in FIG. 4).

Each fastening member 80 is disposed in an opening of the support plate 66 with its support flange 83 bearing against an upper face of the support plate 66 at the periphery of the opening. The support flange 83 is fastened on the support plate 66, for example by means of screws.

Each fastening member 80 includes an actuating mechanism 86 for actuating the clamping finger 84. The actuating mechanism 86 comprises a control element 88 mounted in a slidable manner within the tubular body 82 and a connecting rod 90 connecting the control element 88 and the clamping finger 84 in a manner such that the axial movement of the control element 88 causes rotation of the gripping finger 84. The actuating mechanism 86 includes a clamping screw 92 screwed into a threaded section of the tubular body 82 and bearing against the control element 88, in a manner such that screwing of the clamping screw 92 moves the control element 88 so as to move the gripping finger 84 to the extended position.

The screwing of the clamping screw 92 makes it possible to apply the clamping finger 84 against the lower surface of the upper spacer plate 10, such that the support plate 66 and the upper spacer plate 10 are clamped against each other between the support flange 83 and the gripping finger 84.

In operation, the base 43 is placed on the upper spacer plate 10 in a manner such that each fastening member 80 is inserted into an opening for water circulation 26 of the upper spacer plate 10. Each fastening member 80 is actuated so as to fasten the support plate 66 against the upper spacer plate 10.

The cutting tool 42 is then positioned and fastened on the base 43 (FIG. 2). Thereafter, the electrode holder 47 is moved downwards so as to cut the upper spacer plate 10 and then the lower spacer plate (FIG. 3).

The circular tubular electrode 46 enables the cut to be executed in one single pass. By way of a variant, the electrode 46 has a cutting edge extending along one circular arc or two diametrically opposite circular arcs. In this case, the cutting of a spacer plate is executed in several passes, by causing the electrode to pivot between passes around the sliding axis A. In a general manner, the or each spacer plate 8, 10 is cut along a line, in a continuous manner in a single pass or in a discontinuous manner in several passes.

Once the heating rod 6 is free of each spacer plate 8, 10, the gripping device 48 is then actuated so as to grip the defective heating rod 6, and the electrode holder 47 is raised so as to exert an upwards traction pulling on the defective heating rod 6.

According to the method of the invention, if the sleeve 28 of the defective heating rod 6 that is extracted is reusable, a replacement heating rod is fixed in place at the location of the extracted defective heating rod 6.

Figure 5:
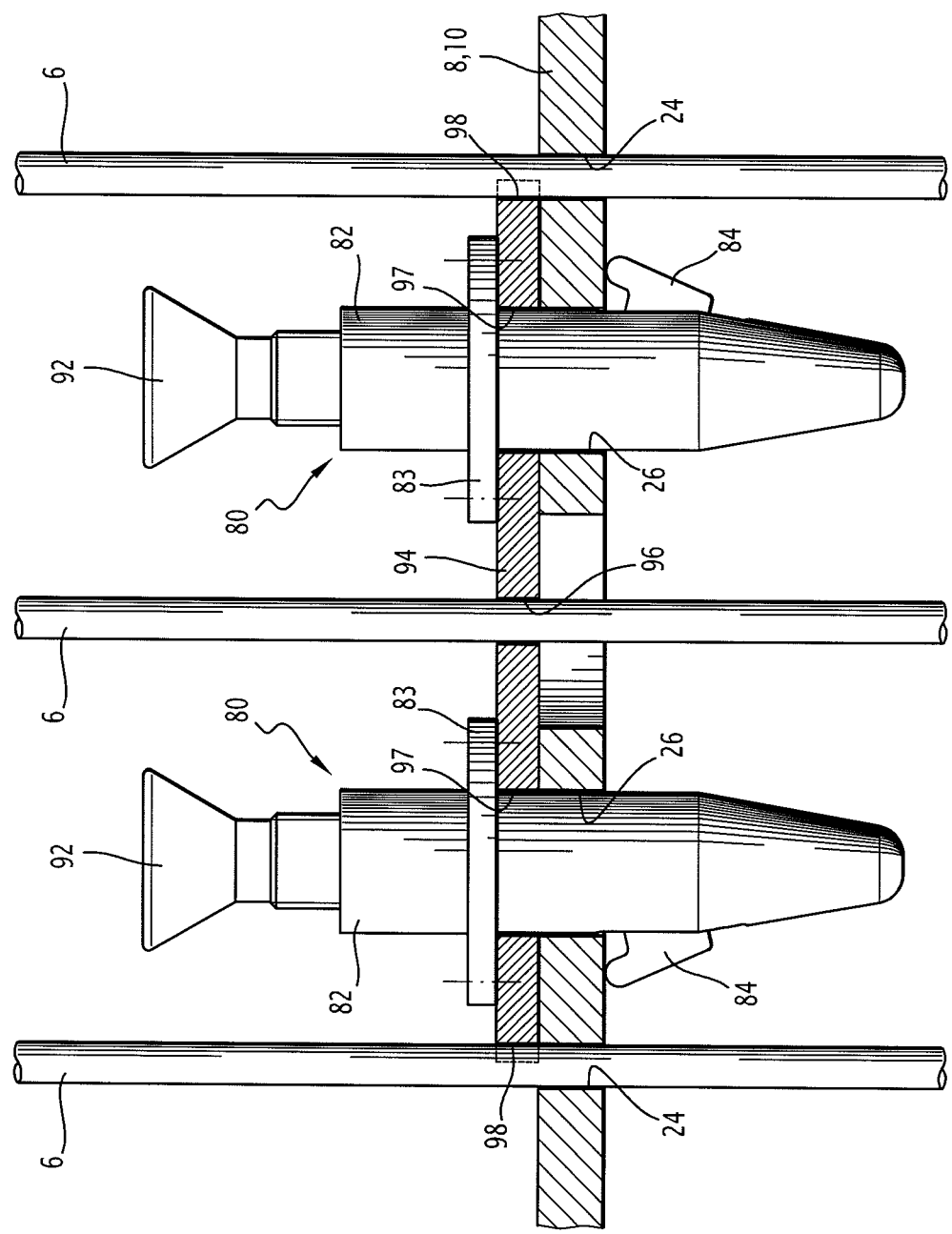
FIG. 5 is a partial cross sectional view of the pressuriser illustrating a step for replacing of the defective heating rod by a replacement heating rod.

In order to do this, as shown in FIG. 5, a section of plate 94 is attached on to the spacer plate. The section of plate 94 includes an opening for the heating rod 96 for passage of the replacement heating rod 6.

According to the method, the section of plate 94 is positioned by using as reference points the water circulation openings 26 of the spacer plate 8, 10 and/or the adjacent heating rods 6.

The section of plate 94 includes openings for fastening 97 designed to be facing the water circulation opening 26 of the spacer plate 8, 10, for insertion of the fastening member 80 that is identical to those described with reference to FIG. 5.

The plate section 94 includes positioning notches 98, adapted to receive the heating rods 6 adjacent to the replacement heating rod 6.

Thereafter, the replacement heating rod 6 is inserted through the sleeve 28, and through the heating rod opening 98 of the section of plate 94.

Thanks to the invention, it is possible to easily extract a defective heating rod without having to cut the heating rod inside the pressuriser in order to extract it from the spacer plates and remove it from the pressuriser. It makes possible the extraction of a heating rod having significant deformations, which make the cutting of the heating rod difficult. If the heating rod has been broken, the cutting of the heating rod for example, could generate a lot of debris that would be likely to spread in the primary circuit and damage other elements of the nuclear reactor, such as the nuclear fuel assemblies. It is possible to easily carry out the replacement of a defective heating rod with a replacement heating rod. The extraction tool apparatus according to the invention is simple and allows for a controlled implementation that does not pose any risks to the integrity of the pressuriser and the restarting of the installation.

What is claimed is:

1. A method for working on a defective heating element of a pressuriser comprising a tank elongated along a longitudinal axis and elongate heating elements extending within the tank, and at least one spacer plate through which the heating elements pass and which is capable of maintaining a transverse spacing between the heating elements, the method comprising:

cutting at least one spacer plate around the heating element so as to detach the heating element from the spacer plate; and then extracting the heating element from the tank.

2. The method as recited in claim 1 wherein the heating element is extracted in one single piece.

3. The method as recited in claim 1 wherein the heating element is extracted by at least one of pulling on an upper end portion of the heating element and by pushing on a lower end portion of the heating element, with a lower end portion extending through a wall of the tank and out to the exterior of the tank.

4. The method as recited in claim 1 wherein the or each spacer plate is cut by an electrical discharge cutting tool comprising an electrical discharge head and an electrical discharge electrode.

5. The method as recited in claim 4 wherein the electrode is slipped around the heating element and then the electrode is lowered in a manner so as to cut the or each spacer plate around the heating element.

6. The method as recited in claim 4 wherein the cutting tool is fastened onto a spacer plate by positioning the cutting tool while using as reference points at least one of the heating elements adjacent to the heating element to be extracted and water circulation openings for the circulation of water through the or each spacer plate.

7. The method as recited in claim 4 wherein the electrode is tubular.

8. The method as recited in claim 1 wherein the heating element is detached from a through passage sleeve of the heating element through a wall of the tank on the exterior of the tank.

9. The method as recited in claim 4 wherein a replacement heating element is positioned in place at the location of the extracted heating element.

10. The method as recited in claim 9 wherein the heating element is fixed to the spacer plate by a section of plate that is attached and fastened to the spacer plate and includes a through opening for passage of the replacement heating element.

11. The method as recited in claim 10 wherein the section of plate is positioned by using as reference points the heating elements adjacent to at least one of the replacement heating element and the openings for circulation of water through the or each spacer plate.

12. The method as recited in claim 1 wherein the extracted heating element is disposed in a handling container inside the tank prior to extracting the heating element from the tank.

* * * * *